(12) United States Patent
Madukkarumukumana et al.

(10) Patent No.: US 7,937,534 B2
(45) Date of Patent: May 3, 2011

(54) PERFORMING DIRECT CACHE ACCESS TRANSACTIONS BASED ON A MEMORY ACCESS DATA STRUCTURE

(76) Inventors: Rajesh Sankaran Madukkarumukumana, Portland, OR (US); Sridhar Muthrasanallur, Puyallup, WA (US); Ramakrishna Huggahalli, Scottsdale, AZ (US); Rameshkumar G. Illikkal, Portland, OR (US)

( * ) Notice: Subject to any disclaimer, the term of this patent is extended or adjusted under 35 U.S.C. 154(b) by 978 days.

(21) Appl. No.: 11/323,262

(22) Filed: Dec. 30, 2005

(65) Prior Publication Data
US 2007/0156968 A1 Jul. 5, 2007

(51) Int. Cl.
*G06F 13/368* (2006.01)
(52) U.S. Cl. .................... 711/138; 711/E12.052
(58) Field of Classification Search .................. 711/138
See application file for complete search history.

(56) References Cited

U.S. PATENT DOCUMENTS

| | | | |
|---|---|---|---|
| 6,075,938 | A | 6/2000 | Bugnion |
| 6,163,834 | A | 12/2000 | Garcia |
| 6,636,906 | B1 * | 10/2003 | Sharma et al. ............ 710/22 |
| 6,725,289 | B1 * | 4/2004 | Waldspurger et al. ........ 710/9 |
| 2002/0138699 | A1 * | 9/2002 | Okamura .................. 711/133 |

FOREIGN PATENT DOCUMENTS

| | | |
|---|---|---|
| WO | PCT2006048555 | 12/2006 |
| WO | 2007/078958 A2 | 7/2007 |
| WO | 2007/078958 A3 | 1/2008 |

OTHER PUBLICATIONS

Huggahalli et al, "Direct Cache Access for High Bandwidth Network I/O" Jun. 4 2005, Computer Architecture ISCA '05 Proceedings 32nd International Symposium, IEEE, p. 50-58.*
International Searcing Authority, International Search Report, International application No. PCT/US2006/048555, Mailing date Oct. 16, 2007; entire report 23 pages.
Huggahalli et al., Direct Cache Access for High Bandwidth Network I/O, International Symposium on Computer Architecture archive, Proceedings of the 32nd annual international symposium on Computer Architecture table of contents pp. 50-59, Year of Publication: 2005,ISBN ~ ISSN:1063-6897, 0-7695-2270-X.
International Preliminary Report on Patentability received for PCT Patent Application No. PCT/US2006/048555, mailed on Jul. 10, 2008, 7 pages.
Office Action Received for Korean Patent Application No. 10-2008-7015767, mailed on Aug. 9, 2010, 5 pages of Office Action and 4 pages of English Translation.
Office Action Received for Chinese Patent Application No. 200680050112.1, mailed on May 26, 2010, 4 pages of Office Action and 8 pages of English Translation.
Office Action Received for Korean Patent Application No. 10-2008-7015767, mailed on May 4, 2010. 5 pages of Office Action and 1 page of English Translation.

* cited by examiner

*Primary Examiner* — Reginald G Bragdon
*Assistant Examiner* — Kenneth M Lo
(74) *Attorney, Agent, or Firm* — Thomas R. Lane

(57) ABSTRACT

Embodiments of an apparatus, method, and system for encoding direct cache access transactions based on a memory access data structure are disclosed. In one embodiment, an apparatus includes memory access logic and transaction logic. The memory access logic is to determine whether to allow a memory access based on a memory access data structure. The transaction logic is to assign direct cache access attributes to a transaction based on the memory access data structure.

10 Claims, 7 Drawing Sheets

PERFORMING DIRECT CACHE ACCESS TRANSACTIONS BASED ON A MEMORY ACCESS DATA STRUCTURE

BACKGROUND

1. Field

The present disclosure pertains to the field of information processing, and, more specifically, to the field of transactions between input/output devices and memory in information processing systems.

2. Description of Related Art

Direct cache access "DCA" is an information processing system protocol that permits data from an input/output ("I/O") device to be placed into a processor's cache. DCA may be used to avoid system memory access latency and bandwidth restrictions by placing the data into the processor's cache before, instead of, or in parallel with placing the data into system memory, or by placing the data into system memory or an intermediate cache and using a prefetch hint to trigger the placement of the data into the processor's cache.

The DCA protocol involves the use of DCA attributes, assigned per I/O transaction, that may determine whether DCA is enabled or disabled for a particular transaction, which processor's cache the data is to be placed into, how the data is to be placed into the processor's cache (e.g., in which way of a multi-way cache, and in what line state, e.g. exclusive or modified), or other details of a DCA transaction. Some of these attributes may be implementation or platform specific, for example, in a prefetching approach, the DCA attributes may include a length attribute for multi-line prefetches or a prefetch stride.

The DCA attributes are typically passed, in a peripheral bus transaction, from an I/O device to a chipset that encodes a corresponding transaction on a processor bus to pass the data to the processor's cache. For example, FIG. 1 illustrates a known approach to performing a DCA transaction in system 100, in which processors 110 and 120 are coupled to chipset 130 through processor bus 105. Chipset 130 is coupled to I/O device 140 through peripheral bus 135. Processor 110 includes core 112 and cache 113, core 114 and cache 115, core 116 and cache 117, and core 118 and cache 119. Processor 120 includes core 122 and cache 123, core 124 and cache 125, core 126 and cache 127, and core 128 and cache 129.

A DCA transaction in system 100 includes I/O transaction 150 on peripheral bus 135, where I/O transaction 150 includes field 151 to specify an address and/or data and field 152 to specify DCA attributes for the transaction. Chipset 130 receives I/O transaction 150, decodes the contents of fields 151 and 152, if necessary, and encodes system transaction 160. System transaction 160 includes field 161 to specify an address and/or data and field 162 to specify DCA attributes for the transaction. In FIG. 1, system transaction 160 is performed on processor bus 105 and targets cache 115.

The use of different peripheral busses, such as Peripheral Component Interconnect ("PCI"), PCI-X, PCI-Express, and Universal Serial Bus ("USB"), in different information processing systems may require varied approaches to passing DCA attributes in an I/O transaction. For example, since DCA did not exist when PCI-Express was defined, there are no PCI-Express fields that may be allocated exclusively for DCA use. Therefore, a custom approach to a DCA transaction on a PCI-Express bus may, for example, use a limited five-bit portion of the "tag" field in a PCI-Express transaction.

The use of such varied approaches, rather than a standard approach across different I/O buses, may limit the broad adoption of DCA.

BRIEF DESCRIPTION OF THE FIGURES

The present invention is illustrated by way of example and not limitation in the accompanying figures.

DETAILED DESCRIPTION

The present invention may be embodied in an apparatus, method, or system for performing DCA transactions based on a memory access data structure as described below. In the following description, numerous specific details such as logic, circuit, and system configurations are set forth in order to provide a more thorough understanding of the present invention. It will be appreciated, however, by one skilled in the art, that the invention may be practiced without such specific details. Additionally, some well known structures, circuits, techniques, and the like have not been shown in detail, to avoid unnecessarily obscuring the present invention.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or expression that is implemented or embodied in a hardware structure (e.g., flash memory or read only memory). Examples of firmware are microcode, writable control store, and micro-programmed structure.

Figure 2:
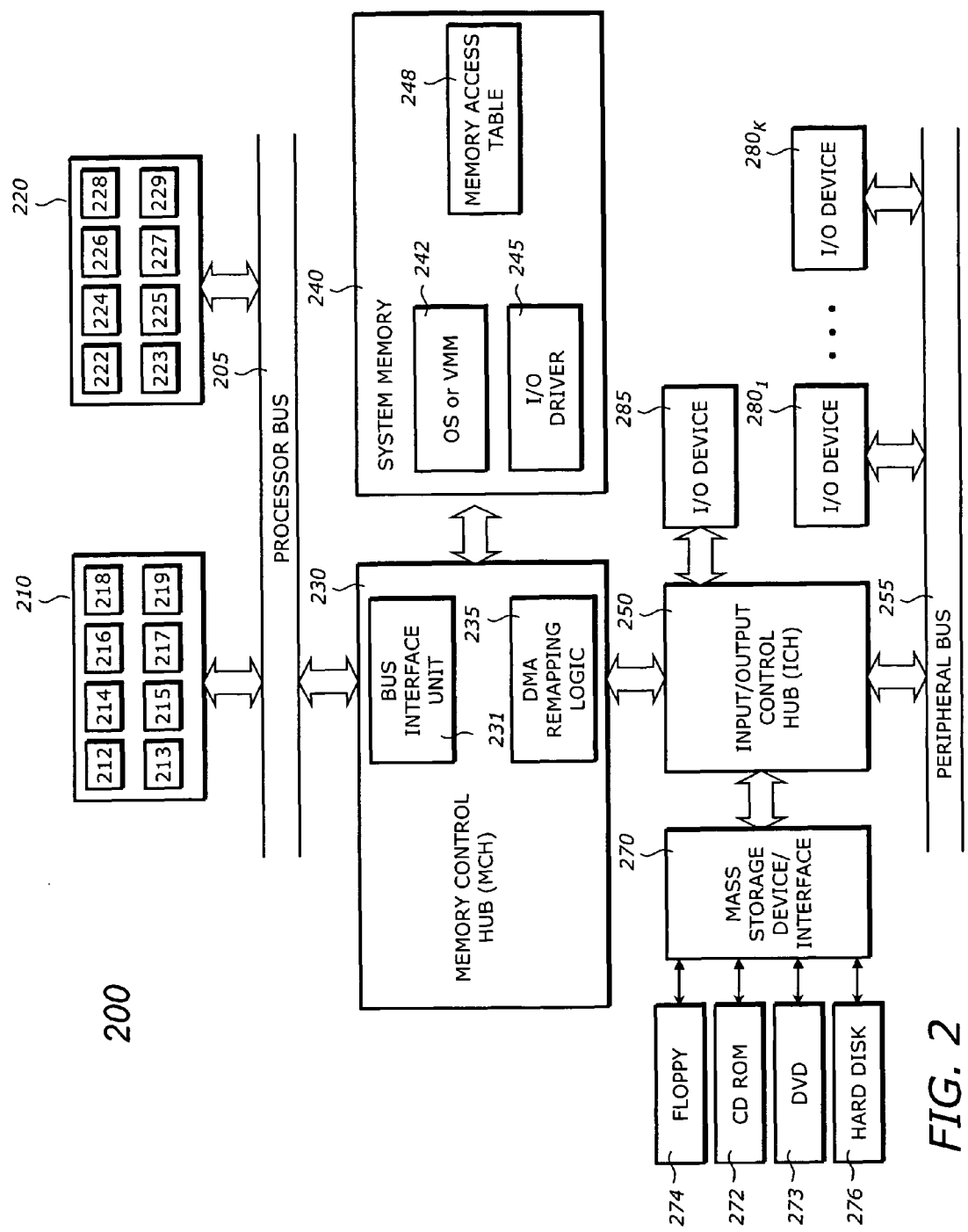
FIG. 2 illustrates a system in which direct cache access transactions may be performed according to an embodiment of the present invention.

FIG. 2 is an illustration of system 200 in which direct cache access transactions may be performed according to an embodiment of the present invention. System 200 includes processors 210 and 220, processor bus 205, memory control hub ("MCH") 230, system memory 240, input/output control hub ("ICH") 250, peripheral bus 255, mass storage device/interface 270, and I/O devices $280_1$ to $280_K$ and 285. System 200 may include more or less elements than those above.

Processors 210 and 220 may be any components having one or more execution cores, where each execution core may be based on any of a variety of different types of processors, such as a processor in the Pentium® Processor Family, the Itanium® Processor Family, or other processor family from Intel Corporation, or any other general purpose or other processor from another company. Processor 210 includes cores 212, 214, 216, and 218, and caches 213, 215, 217, and 219. Processor 220 includes cores 222, 224, 226, and 228, and caches 223, 225, 227, and 229.

Processor bus 205 may be any parallel, sequential, pipelined, asynchronous, synchronous, or other bus or point-to-point connection to allow processors 210 and 220 to communicate with each other, other processors, or other devices, e.g., MCH 230.

MCH 230 provides control and configuration of memory and I/O devices, such as system memory 240 and ICH 250, respectively. MCH 230 includes bus interface unit 231 to interface with and encoding transaction on processor bus 205, and DMA remapping logic 235, as described below. MCH 230 may be integrated into a chipset that integrates other components, such as ICH 250, and/or multiple functionalities such as system logic, bus bridging, memory control, and I/O device control.

System memory 240 may be any type of memory to store information, such as program code and data. System memory 240 is typically implemented with dynamic random access memory ("DRAM") or static random access memory ("SRAM"). System memory 240 may be used to store code, data, or any other information, including operating system ("OS") or virtual machine monitor ("VMM") 242, in whole or in part, I/O driver 245, and any code or data that is used to implement embodiments of the invention, such as memory access table 248, as described below.

Mass storage device/interface 270 may interface to any type of magnetic, optical, or other machine-accessible media, such as compact disk 272, digital versatile disk 273, floppy disk 274, and hard drive 276. Code, data, and any other information, including embodiments of the invention, may be stored on any such media and accessed through mass storage device/interface 270.

ICH 250 may include a number of peripheral functions such as direct memory access ("DMA") controller, interrupt controller, power management logic, timer, I/O device interface, and interface to peripheral bus 255 and/or any other bus or connection such as a USB or low pin count ("LPC") interface. ICH 250 may be integrated into a chipset together with any other components, such as MCH 230.

ICH 250 interfaces directly to I/O device 285 and through peripheral bus 255 to I/O devices $280_1$ to $280_K$. Peripheral bus 255 may be any type of bus that supports I/O transactions, such as a PCI, PCI Express, or Industry Standard Architecture ("ISA") bus. I/O devices $280_1$ to $280_K$ and 285 may be any I/O devices to perform I/O functions, including DMA requests, such as input device controllers (e.g., keyboard, mouse, trackball, pointing device), media cards (e.g., audio, video, graphics), network cards, and any other peripheral devices.

Returning to MCH 230, MCH 230 includes DMA remapping logic 235, which maps an I/O device (e.g., one of I/O device $280_1$ to $280_K$ and 285) into a domain (as described below) in system memory 240 in an I/O transaction. The I/O transaction is typically a DMA request (i.e., a request from an I/O device to directly access system memory 240), but may be any other type of transaction as well. DMA remapping logic 235 provides hardware support to facilitate or enhance I/O device assignment and/or management. DMA remapping logic 235 may alternatively be included in any component other than MCH 230, such as ICH 250. It may also be implemented, partly or wholly, in processor 210 or 220, or any other processor, co-processor, chipset, or other device.

A domain is abstractly defined as an isolated environment in the system, to which a subset of the system memory 240 is allocated. I/O devices that are allowed to directly access the memory that is allocated to a domain are referred to as that domain's assigned devices. The isolation of a domain is achieved by blocking access to its allocated memory from devices that are not assigned to it. Multiple isolated domains are supported by ensuring that all I/O devices are assigned to some domain (possibly a default domain), and restricting access from each assigned device to only the memory allocated to its domain.

Each domain has a view of memory, or a physical address space, that may be different than the system view of memory. An address used to access memory according to the system view of memory is referred to as a host physical address ("HPA"). An address used by a domain's resources to access its physical address space is referred to as a guest physical address ("GPA"). A domain is considered non-relocated if its GPA space is the same as, or a subset of, the HPA space. A domain is considered relocated if its GPA space is translated to access its allocated HPA space. The logical separation of GPA and HPA spaces provides the basis for enforcing memory protection. It requires an address protection and possibly translation mechanism that can validate GPAs generated by a domain's assigned devices and possibly translate them to valid HPAs. DMA remapping logic 235 provides hardware support for this functionality, referred to as DMA remapping.

Figure 3:
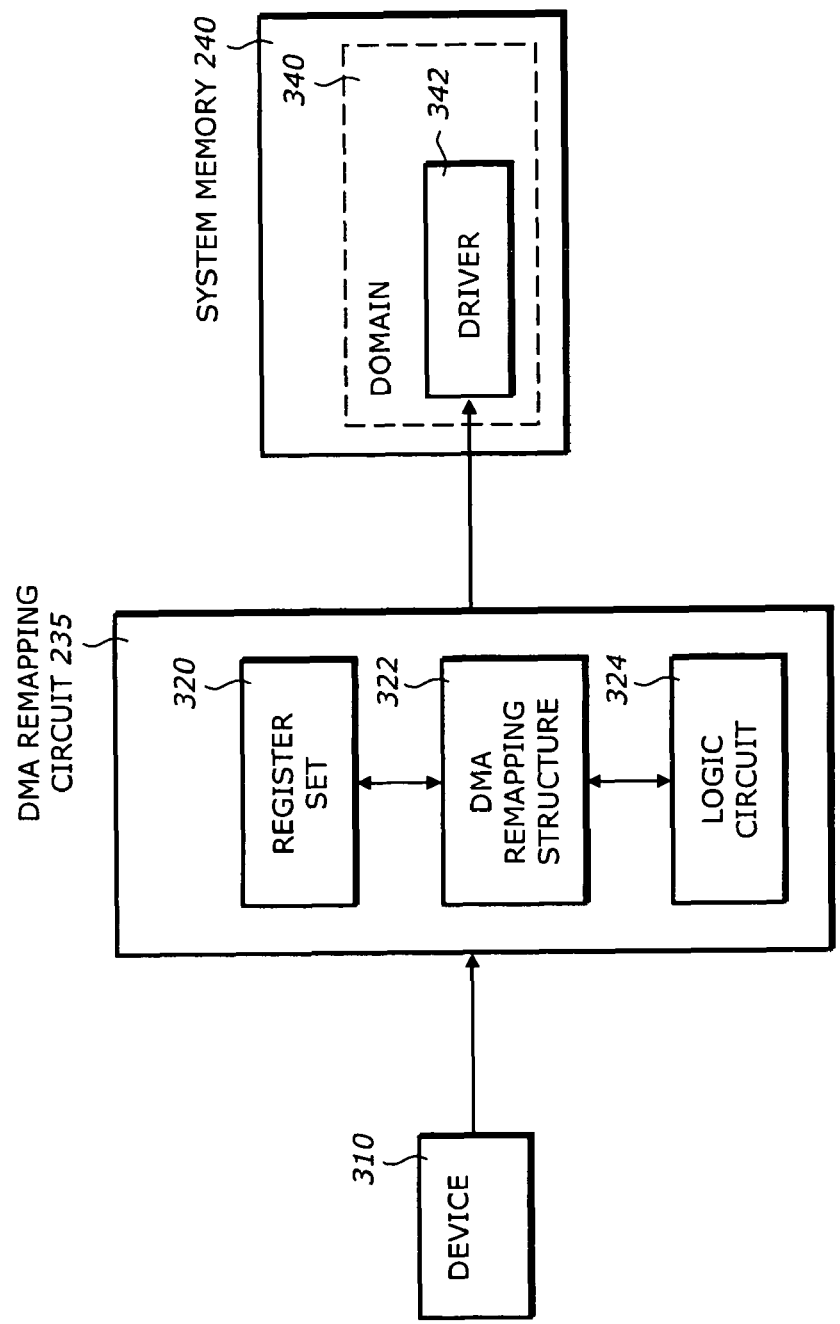
FIG. 3 illustrates an example of I/O device assignment to a domain.

FIG. 3 is a diagram illustrating an example of I/O device assignment to a domain. I/O device assignment is a mapping of an I/O device to a domain in system memory 240. The mapping is supported by DMA remapping logic 235. In FIG. 3, device 310 is mapped into domain 340 in system memory 240. Domain 340 may have one or more driver(s) 342 for device 310.

DMA remapping logic 235 includes register set 320, DMA remapping structure 322, and logic circuit 324. Register set 320 includes a number of registers that provide storage for control or status information used by DMA remapping structure 322, logic circuit 324, and programs or drivers for I/O devices. DMA remapping structure 322 provides the basic structure, storage, or tables used in the remapping or address translation of GPAs to HPAs. Logic circuit 324 includes circuitry to perform the remapping or address translation operations.

I/O device assignment and/or management using DMA remapping logic 235 may be used in any number of ways, such as to provide an isolated domain for an OS. For example, an OS may define a domain to contain its critical code and data structures, and restrict access to this domain from all I/O devices. This domain isolation technique allows the OS to limit erroneous, unintended, or other corruption of its code and data through I/O devices and their drivers.

DMA remapping logic 235 may also be used to support a virtualization environment. Generally, a virtualization environment is implemented by using VMM software, having complete, direct control over a system and its resources, to create abstractions of systems ("virtual machines" or "VMs") on which other software ("guests") may run as if in complete, direct control over a VM and its resources. The VMM maintains the virtualization environment by allocating and sharing system resources between the VMs, and isolating the VMs from each other to protect each VM from guests running on other VMs.

DMA remapping logic 235 may be used to support virtualization by mapping the VMM to a domain, mapping each VM to a domain, and assigning individual I/O devices to individual domains corresponding to individual VMs. Therefore, a driver for an I/O device may be assigned to run only in the VM to which it is assigned, and may be allowed to interact directly with the I/O device without having to pass control to the VMM.

Figure 4:
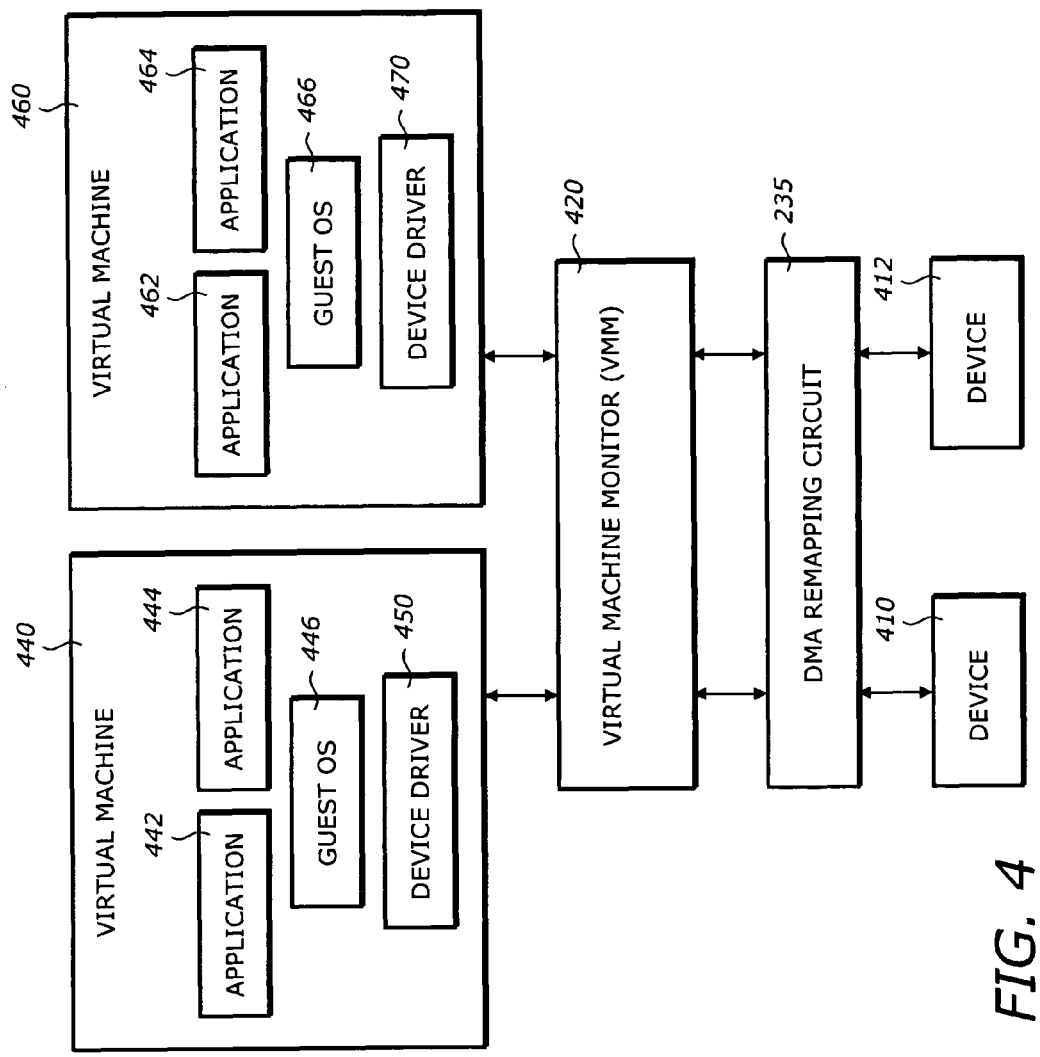
FIG. 4 illustrates an example of using DMA remapping to support virtualization.

FIG. 4 illustrates an example of using DMA remapping to support virtualization. In FIG. 4, guests running on VM 440 include device driver 450, guest OS 446, and applications 442 and 444. Guests running on VM 460 include device driver 470, guest OS 466, and applications 462 and 464. Device drivers 450 and 470 are drivers that drive, control, interface, or support I/O devices 410 and 412, respectively. I/O device 410 is assigned to VM 440, and I/O device 412 is assigned to VM 460.

Generally, guests access system resources through VMM 420, for example, by trapping to VMM 420 when attempting an I/O operation. However, because device 410 is assigned to VM 440 and its driver 450 runs on VM 440, guest OS 446 and applications 442 and 444 may access device 401 without trapping to VMM 420. Similarly, device 410 may access memory allocated to its domain, e.g., through a DMA request, without trapping to VMM 420. DMA remapping logic 235 supports this capability by translating GPAs used by I/O devices to corresponding HPAs, and denying access from an I/O device to a memory location outside its allocated domain.

Figure 5:
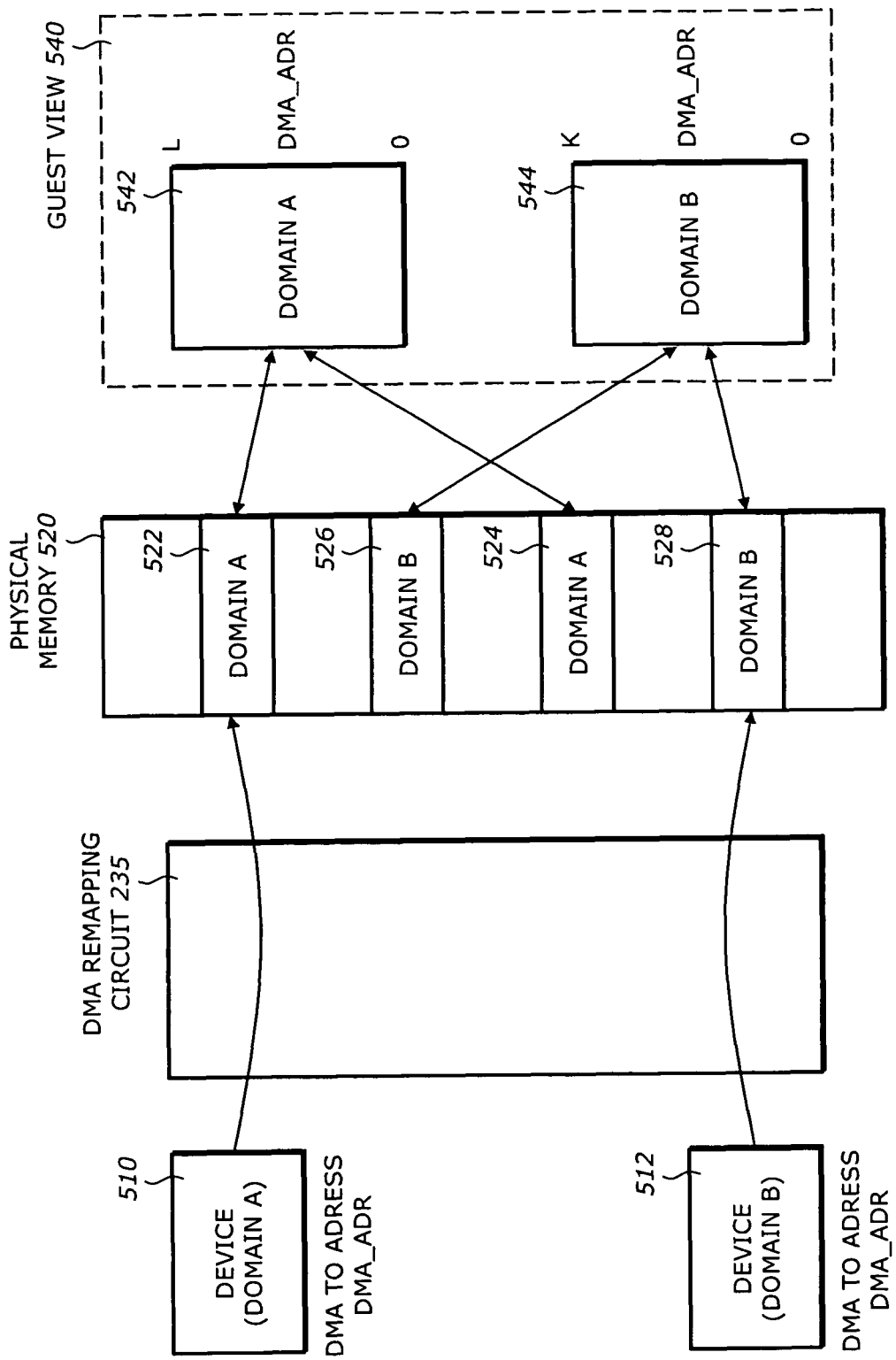
FIG. 5 illustrates an example of I/O address translation.

FIG. 5 illustrates an example of I/O address translation. In FIG. 5, I/O device 510 is assigned to domain A and I/O device 512 is assigned to domain B. Each I/O device may perform an I/O request or DMA request to address DMA_ADR. DMA remapping logic 235 maps a request to DMA_ADR from I/O device 510 to section 522 of physical memory 520, where sections 522 and 524 of physical memory are allocated to domain A. Likewise, DMA remapping logic 235 maps a request to DMA_ADR from I/O device 512 to section 528 of physical memory 520, where sections 526 and 528 of physical memory are allocated to domain A. Sections 522, 524, 526, and 528 may be the size of a page according to the memory management model of the system, or any other size of a portion of physical memory.

Guest view 540 of system memory is a logical view from the perspective of guest I/O devices. Guest I/O device 512 sees section 542 as the address space of the system, while guest I/O device 510 sees section 544 as the address space of the system. The VMM or other software responsible for the creation and management of the domains allocates physical memory 520 for each domain and sets up the GPA to HPA translation function in DMA remapping logic 235.

The address translation function implemented by DMA remapping logic 235 depends on the physical memory management model of the system. For example, where host physical memory is allocated as contiguous regions to domains, the translation function may be a simple offset addition. Alternatively, DMA remapping logic 235 may refer to a data structure to perform an address translation, for example where host physical memory is managed at page granularity. Other embodiments may use a data structure to define address ranges that individual devices are allowed to access. Other embodiments may use any combination of these or other techniques.

The data structure referred to by DMA remapping logic 235 (the "memory access data structure"), may be any form of data structure, such as a single or multi-level table. The data structure, or any portion of the data structure, may be stored in any storage space accessible to DMA remapping logic 235, such as DMA remapping structure 322, or memory access table 248 in system memory 240. All or part of the information in the data structure may be copied or duplicated in one or more storage spaces, for example, entries from memory access table 248, or results of translations by DMA remapping logic 235, may be stored in a translation lookaside or other buffer in DMA remapping structure 322 or elsewhere.

Figure 6:
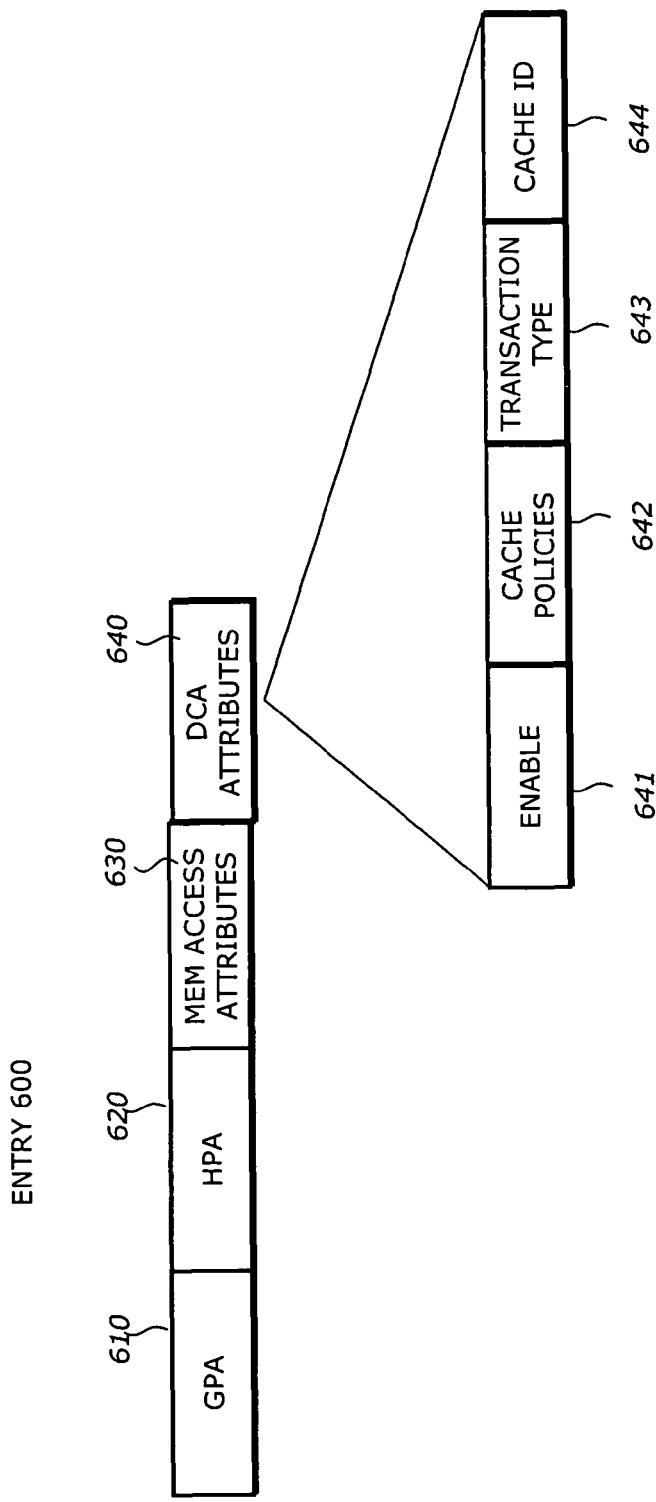
FIG. 6 illustrates an entry in a memory access data structure according to an embodiment of the present invention.

FIG. 6 illustrates entry 600 in a memory access data structure according to an embodiment of the invention. Entry 600 includes four fields, each of which may include any number of bit locations. GPA field 610 is to store a GPA, or a portion of a GPA, that may be used by an I/O device to access system memory. HPA field 620 is to store an HPA, or a portion of an HPA, that corresponds to the GPA stored in GPA field 610, according to any memory address translation function, as described above. In one embodiment, each of the addresses stored in GPA field 610 and HPA field 620 specifies the base address of a page of system memory, such that all accesses to a single page in system memory require only one entry in the memory access data structure. In such an embodiment or in other embodiments, a single entry in a memory access data structure may represent a range of addresses rather than a single address.

Memory access attribute field 630 is to store memory access attributes corresponding to the entries in fields 610 and 620. For example, memory access field 630 may be used to store a value to indicate whether a DMA (or other I/O) transaction to the corresponding address or address range is permitted, a value to indicate whether processor caches must be snooped on a DMA (or other I/O) transaction to the corresponding address or address range, and any other values or indicators related to DMA (or other I/O) transactions to the corresponding address or address range.

DCA attribute field 640 is to store DCA attributes corresponding to the entries in fields 610 and 620. For example, DCA attribute field 640 may include enable/disable field 641 to store a value to indicate whether DCA is enabled or disabled for the corresponding address or address range, cache policy field 642 to store a value to indicate a cache policy (e.g., exclusive or modified) to be used for a DCA transaction to the corresponding address or address range, system transaction type field 643 to store a value to indicate a system transaction type to be used for a DCA transaction to the corresponding address or address range, target field 644 to store a value to indicate the identity of the processor or the cache to be used as the target of a DCA transaction to the corresponding address or address range, and any other fields to store values, indicators, or attributes related to a DCA transaction to the corresponding address or address range, such as, in a prefetching approach, a length attribute for multi-line prefetches or a prefetch stride.

Figure 7:
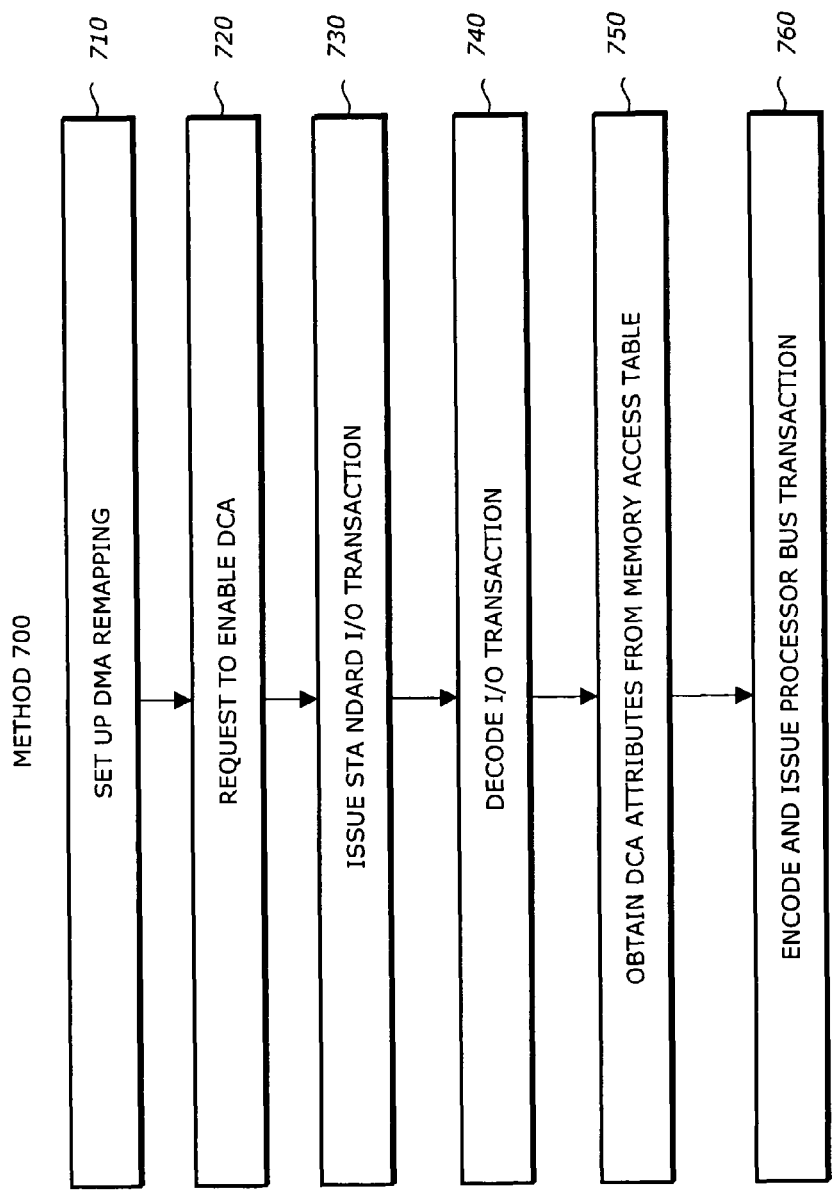
FIG. 7 illustrates a method of performing a direct cache access transaction according to an embodiment of the present invention.

FIG. 7 illustrates method 700 for performing a DCA transaction in system 200 according to an embodiment of the invention. In block 710, OS (or VMM) 242 configures DMA remapping logic 235 and sets up memory access data structure 248 according to the specific implementation of DMA remapping logic 235 and the desired address protection and/or translation function.

In block 720, I/O driver 245 makes a request to OS (or VMM) 242 to enable DCA for an entry (e.g., entry 500) in memory access data structure 248. Alternatively, the entry may be an entry within a memory access data structure in DMA remapping logic 235 or any other storage space in system 200. In making the request, I/O driver 245 provides the desired DCA attributes to be stored in entry 600. The request is handled by OS (or VMM) 242, which may be responsible for providing a software interface that may be used by I/O driver 245 to make DCA requests and provide DCA attributes. Therefore, the complete set of DCA attributes within entry 600 may include attributes provided by I/O driver 245 and attributes provided by OS (or VMM) 242. The corresponding GPA and HPA values may be stored in entry 600 as part of the setting up of memory access data structure 248 in block 710, as part of any subsequent configuration of or processing performed in system 200, or by OS (or VMM) 242 as part of handling the request from I/O driver 245 in block 720.

Figure 1:
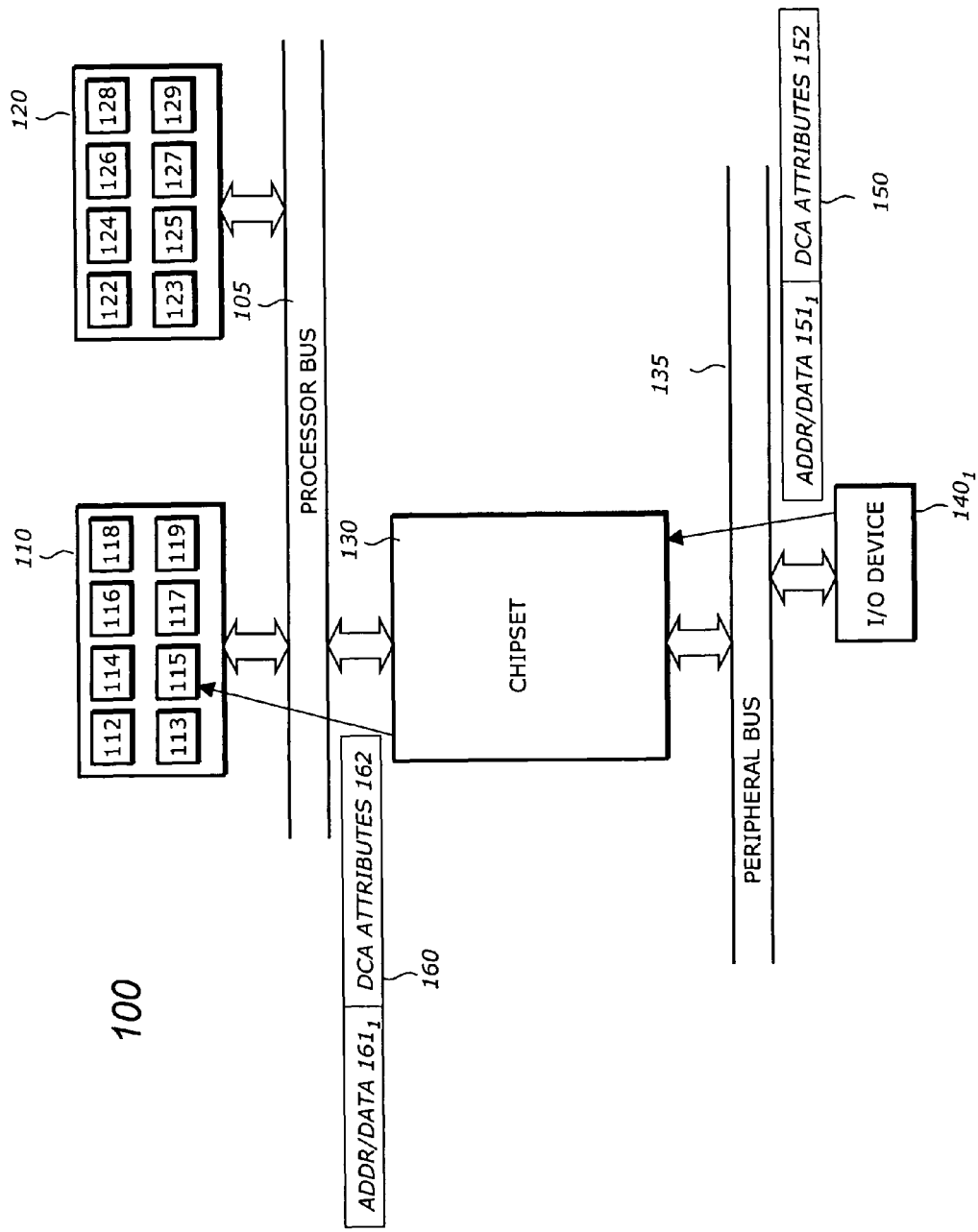
FIG. 1 illustrates a known approach to performing a DCA transaction.

In block 730, an I/O device in system 200 (e.g. I/O device 180) issues an I/O transaction on peripheral bus 155 to the address or address range specified by the GPA in entry 600. Unlike the known approach described with reference to FIG. 1, the I/O device need not be DCA aware and the I/O transaction may be a standard I/O transaction, such as a DMA memory write transaction, including no DCA attributes.

In block 740, MCH 230 receives, and decodes if necessary, the I/O transaction from block 730. In block 750, MCH 230 refers to entry 600 to determine that DCA is enabled for the GPA in entry 500, obtain the DCA attributes from entry 600, and, if necessary, translate the GPA to an HPA.

In block 760, bus interface unit 231 encodes and issues a transaction on processor bus 105, corresponding to the I/O transaction in block 730, based on the DCA attributes stored in entry 600, targeting a cache in system 200 (e.g., any of caches 213, 215, 217, 219, 223, 225, 227, or 229).

DMA remapping logic 235, or any other element designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, embodiments of an invention for performing DCA transactions based on a memory access data structure have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   memory access hardware logic to refer to an entry in a memory access data structure to translate a guest physical address to a host physical address, the guest physical address stored in a first field of the entry and the host physical address stored in a second field of the entry, and to determine whether to allow a direct memory access to the host physical address based on a value stored in a third field of the entry; and
   transaction hardware logic to assign direct cache access attributes to a transaction to the host physical address, the direct cache access attributes stored in a fourth field of the entry, and to encode the transaction based on the direct cache access attributes.

2. The apparatus of claim 1, further comprising a translation lookaside buffer to store a portion of the memory access data structure.

3. The apparatus of claim 1, wherein the direct cache access attributes include one of direct cache access enable indicator, a cache policy indicator, a transaction type indicator, and a target cache identification indicator.

4. A method comprising:
   referring to an entry in a memory access data structure to translate a guest physical address to a host physical address, the guest physical address stored in a first field of the entry and the host physical address stored in a second field of the entry;
   determining whether to allow a direct memory access transaction to the host physical address based on a value stored in a third field of the entry; and
   obtaining attributes for a direct cache access transaction to the host physical address, the attributes stored in a fourth field of the entry;
   assigning the attributes to the direct cache access transaction; and
   encoding the direct cache access transaction on a processor bus, based on the direct cache access attributes.

5. The method of claim 4, wherein the direct cache attributes include one of direct cache access enable indicator, a cache policy indicator, a transaction type indicator, and a target cache identification indicator.

6. A system comprising:
   a memory;
   a cache;
   a device;
   memory access logic to refer to an entry in a memory access data structure to translate a guest physical address to a host physical address in the memory, the guest physical address stored in a first field of the entry and the host physical address stored in a second field of the entry, and to determine whether to allow the device to access the host physical address in the memory based on a value stored in a third field of the entry; and
   transaction logic to assign direct cache access attributes to a transaction between the device and the cache at the host physical address, the direct cache attributes stored in a fourth field of the entry, and to encode the transaction based on the direct cache attributes.

7. The system of claim 6, wherein the direct cache attributes include one of direct cache access enable indicator, a cache policy indicator, a transaction type indicator, and a target cache identification indicator.

8. The system of claim 6, wherein the memory is to store the memory access data structure.

9. The system of claim 8, wherein the memory is also to store a portion of one of an operating system and a virtual machine monitor to set up the memory access data table.

10. The system of claim 8, wherein the memory is also to store a portion of one of an operating system and a virtual machine monitor to configure the memory access logic.

* * * * *